Dec. 7, 1937.   R. S. McKEEVER   2,101,406
PIPE COUPLING
Original Filed Jan. 12, 1937   2 Sheets-Sheet 1

Inventor
R. S. McKeever,
By Barry & Cyr
Attorneys

Dec. 7, 1937.  R. S. McKEEVER  2,101,406
PIPE COUPLING
Original Filed Jan. 12, 1937  2 Sheets-Sheet 2

Inventor
R. S. McKeever
By Barry & Cyr
Attorneys

Patented Dec. 7, 1937

2,101,406

UNITED STATES PATENT OFFICE 2,101,406

PIPE COUPLING

Roy S. McKeever, Tulsa, Okla., assignor to Smith Separator Corporation, Tulsa, Okla., a corporation of Oklahoma Original application January 12, 1937, Serial No. 120,303. Divided and this application April 15, 1937, Serial No. 137,152

1 Claim. (Cl. 285—177)

This invention relates to improvements in joints or connections and more particularly to a special coupling to be used in place of the conventional flange connection on oil and gas separators or the like.

The present application is a division of my parent application, Serial No. 120,303, filed January 12, 1937.

The improved coupling has been designed specifically for use in joining a pipe to a tank or similar vessel but it will be apparent from the present disclosure that it will be useful in other equipment.

Another object is to supply a joint or coupling that is leak-proof and capable of withstanding high pressures.

A further object is to provide a novel coupling of the cam type, co-acting parts of which have overlapping apertured ears to permit the coupling to be tightened by the use of a single bolt.

With the foregoing objects outlined and with other objects in view which will appear as the description proceeds, the invention consists in the novel features hereinafter described in detail, illustrated in the accompanying drawings and more particularly pointed out in the appended claim.

Figure 1:
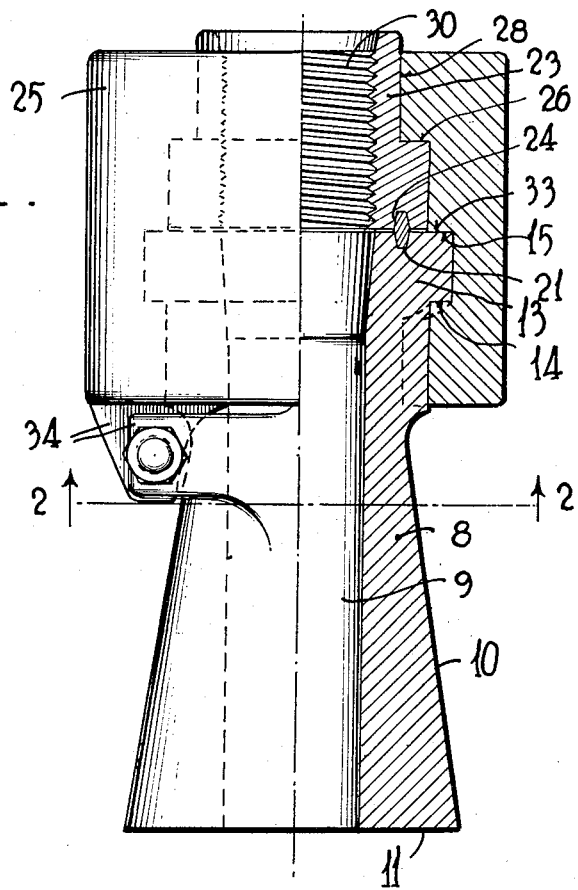
Fig. 1 is an elevation partly in longitudinal section of my improved coupling.
Figure 2:
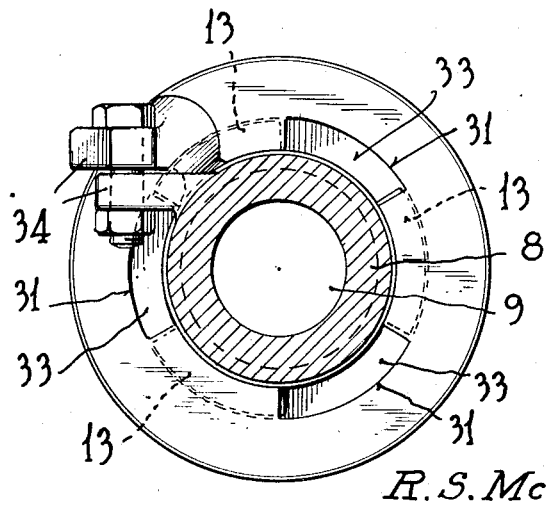
Fig. 2 is a cross-sectional view taken on line 2—2 of Fig. 1.
Figure 3:
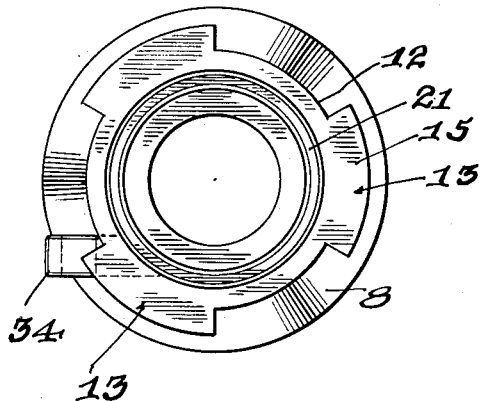
Fig. 3 is an elevation of the outer end of the nozzle portion of the coupling.

Referring to the drawings, 8 designates the nozzle, which is provided with a cylindrical bore 9 and a flared external surface 10 that enlarges toward the inner end 11 of the nozzle.

Figure 4:
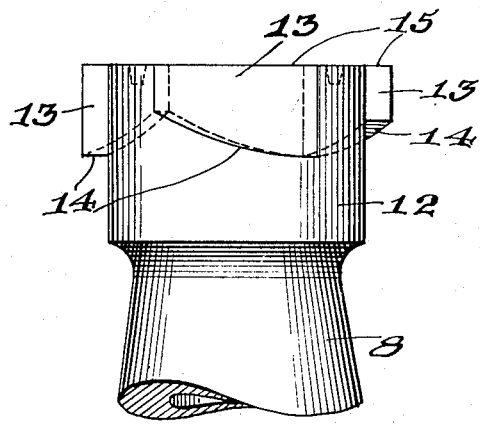
Fig. 4 is a side view of the outer end of the nozzle.
Figure 5:
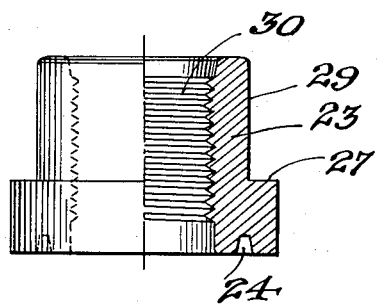
Fig. 5 is a view partly in section and partly in elevation of a nipple forming part of the coupling.

The outer end, as best shown in Fig. 4, is provided with an external cylindrical surface 12 and a plurality of external lugs 13, each having an inclined or cam surface 14 at one end and a plane shoulder 15 at its other end.

For the purpose of connecting a pipe or conduit to such a nozzle by a leak-tight joint which will withstand high pressures, the nozzle is not only provided with the lugs 13 but has an annular recess or groove 21 in its outer end for the reception of a gasket ring 22. A nipple 23 has a similar groove 24 to receive the gasket, and means are provided for drawing the nipple toward the nozzle to effect a tight joint between these parts. Such means includes a collar 25 having an internal annular shoulder 26 which contacts with the external shoulder 27 of the nipple. The collar has an internal cylindrical surface 28 near its outer end which slides on the external cylindrical surface 29 of the nipple, and the latter has internal screw threads 30 for use in connecting a pipe or conduit to the nipple.

Figure 6:
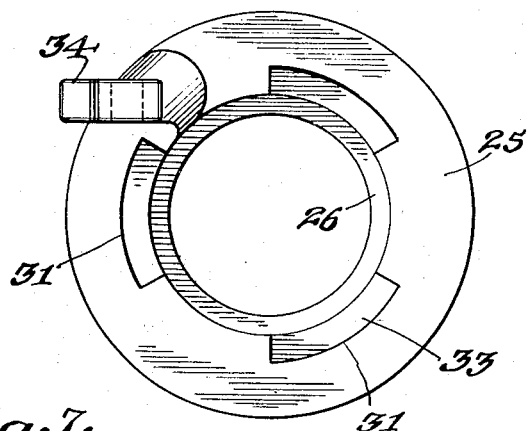
Fig. 6 is an end elevation of a cam ring or collar forming part of the coupling.
Figure 7:
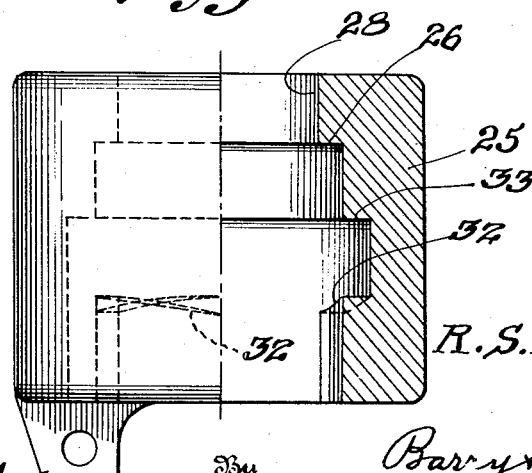
Fig. 7 is a view of said collar partly in longitudinal section and partly in elevation.

As best shown in Figs. 6 and 7, the collar is provided at its inner end portion with a plurality of equally spaced longitudinally extending grooves 31 to receive the lugs 13 of the nozzle in coupling the parts.

The bore of the collar also forms a plurality of inclined or cam surfaces 32 which cooperate with the cam surfaces 14 of the nozzle to form a tight joint when the collar is turned relative to the nozzle. Such turning movement brings the internal shoulder 33 of the collar into tight engagement with the external shoulders 15 of the nozzle.

To assist in turning the collar relatively to the nozzle, each of these parts has an apertured external lug or ear 34 to receive a bolt 35, and it is obvious that when the nut 36 is tightened on the bolt, the ear of the collar will be drawn toward the ear of the nozzle and this will result in the cam surfaces 32 and 14 cooperating to effect a tight joint. The mechanical advantage of this procedure is one to six, or in other words, one unit of pressure applied to the cam surfaces 32 will exert six units of pressure on the gasket ring 22 or the inclined surfaces 14 of the ears of the nozzle.

It has been found from actual practice that a structure of the kind shown in the drawings will withstand pressure up to 3,000 pounds per square inch.

An ordinary flange of the type heretofore used in order to withstand such a pressure would have to be made much thicker than the conventional flanges and would involve the use of a great number of bolts as well as a loose gasket, which is a more difficult connection to take apart as compared to the coupling above described.

The herein disclosed and illustrated embodiment of the invention has given satisfactory results and it will be manifest to those skilled in the art, after an understanding of the invention, that other changes and modifications may be made without departing from the spirit or scope of the invention. It is intended that all matters contained in the above description or shown in the drawings shall be interpreted as illustrative and not in a limiting sense.

What I claim and desire to secure by Letters Patent is:

Means for quick detachably connecting a pipe to a high pressure tank comprising a nozzle adapted to be secured to said tank and having an end groove and spaced peripheral lugs, the inner ends of the lugs being inclined and forming cam surfaces, a nipple adapted to be secured to said pipe and having an external annular shoulder and an end groove, an annular gasket seated in said grooves, a collar surrounding the nozzle and nipple and having an internal annular shoulder near one end thereof impinging against the shoulder of the nipple, internal lugs at the opposite end portion of the collar provided with inclined inner ends forming cam surfaces engaging the cam surfaces of the lugs of the nozzle for moving the nipple toward the nozzle and tightening the gasket when the collar is turned in one direction relatively to the nozzle, overlapping apertured ears projecting respectively from the collar and nozzle, and a bolt extending through said apertures for use in drawing the ears toward one another.

ROY S. McKEEVER.